(12) United States Patent
Schellings

(10) Patent No.: US 7,560,823 B2
(45) Date of Patent: Jul. 14, 2009

(54) WIND ENERGY SYSTEM AND METHOD OF OPERATION THEREOF

(75) Inventor: Vincent Schellings, Enschede (NL)

(73) Assignee: General Electric Company, Schenectady, NY (US)

( * ) Notice: Subject to any disclaimer, the term of this patent is extended or adjusted under 35 U.S.C. 154(b) by 269 days.

(21) Appl. No.: 11/428,035

(22) Filed: Jun. 30, 2006

(65) Prior Publication Data

US 2008/0001409 A1     Jan. 3, 2008

(51) Int. Cl.
*F03D 9/00*     (2006.01)
*H02P 9/04*     (2006.01)

(52) U.S. Cl. .......................................... 290/44; 290/55

(58) Field of Classification Search ................. 290/44, 290/55; 416/132 B; 60/398; 415/4.2, 7, 415/4.5
See application file for complete search history.

(56) References Cited

U.S. PATENT DOCUMENTS

| | | | |
|---|---|---|---|
| 4,114,809 A | | 9/1978 | Sampson |
| 4,160,170 A | | 7/1979 | Harner et al. |
| 4,313,713 A | | 2/1982 | Lois |
| 4,339,666 A | * | 7/1982 | Patrick et al. ................. 290/44 |
| 4,651,017 A | | 3/1987 | Longrigg |
| 4,794,544 A | * | 12/1988 | Albright et al. ............. 700/287 |
| 5,155,375 A | * | 10/1992 | Holley .......................... 290/44 |
| 5,798,631 A | * | 8/1998 | Spee et al. .................... 322/25 |
| 5,982,046 A | | 11/1999 | Minh |
| 6,910,867 B2 | | 6/2005 | Corten |
| 6,940,185 B2 | | 9/2005 | Andersen et al. |

(Continued)

FOREIGN PATENT DOCUMENTS

EP     1736664 A1 * 12/2006

(Continued)

OTHER PUBLICATIONS

Altemark, Jens. Machine translation of document WO 2006/045556 A1, Apr. 2006.*

*Primary Examiner*—Julio Gonzalez
(74) *Attorney, Agent, or Firm*—James McGinness, Esq.; Armstrong Teasdale LLP

(57) ABSTRACT

A method for operating a wind energy system is provided comprising the steps of setting the value of an operational parameter of the wind energy system, measuring a yield parameter of the wind energy system and measuring a condition parameter. Further, the method comprises the step of calculating an optimized value of the operational parameter based on historical data and the outcome of the measurements. The method further comprises the step of resetting the operational parameter to the optimized value of the operational parameter wherein the resetting is such that the yield parameter is optimized. Further, a wind energy system is provided having a sensor unit for measuring a yield parameter of the wind energy system, a sensor for measuring a condition parameter, an actuator for adjustment of at least one adjustable part of the wind energy system, and a self-learning controller. The self-learning controller is connected to the sensor unit and the actuator and receives measurement data from the sensor unit. The self-learning controller performs optimization calculations based on the measurement data and sends instruction signals to the actuator based on the outcome of the optimization calculations for the adjustment of the adjustable part of the wind energy system. The instruction signals are such that the yield parameter is optimized.

20 Claims, 6 Drawing Sheets

U.S. PATENT DOCUMENTS

| | | |
|---|---|---|
| 7,075,189 B2 | 7/2006 | Heronemus et al. |
| 7,256,508 B2 * | 8/2007 | Altemark et al. ............... 290/44 |
| 7,309,930 B2 * | 12/2007 | Suryanarayanan et al. .... 290/55 |
| 2004/0094964 A1 * | 5/2004 | Mikhail et al. ................. 290/44 |
| 2004/0201220 A1 * | 10/2004 | Andersen et al. ............... 290/44 |
| 2005/0184689 A1 * | 8/2005 | Maslov et al. ................ 318/254 |
| 2006/0125241 A1 * | 6/2006 | DuHamel .................... 290/44 |
| 2007/0035135 A1 * | 2/2007 | Yoshida ....................... 290/44 |
| 2007/0205602 A1 * | 9/2007 | Willey et al. .................. 290/44 |
| 2008/0111379 A1 * | 5/2008 | Altemark ..................... 290/44 |

FOREIGN PATENT DOCUMENTS

| | | | |
|---|---|---|---|
| WO | WO 2006037576 A1 * | 4/2006 | |
| WO | WO 2006045556 A1 * | 5/2006 | |

* cited by examiner

WIND ENERGY SYSTEM AND METHOD OF OPERATION THEREOF

FIELD OF THE INVENTION

The present invention relates to a wind energy system and a method of operation thereof.

BACKGROUND OF THE INVENTION

The operation of modern wind energy systems underlies strong economic pressures. Often, wind energy system producers have to give warranty on the energy yield of a wind energy system. If the yield of a wind energy system in operation turns out to be below the yield value which was promised, the producers have to pay high contractual penalties to the operators of the wind energy system.

It is therefore typical that wind energy systems are operated such that a high yield can be expected. In order to do so, the multitude of parameters for the operation of a wind energy system, which can be set and adjusted when the wind energy system is operated, is set to the values that are expected to provide for a maximum yield. However, despite this setting, experience shows that wind energy systems very often still run sub-optimally.

BRIEF DESCRIPTION OF THE INVENTION

In view of the above, a method for operating a wind energy system is provided including the steps of setting the value of at least one operational parameter of the wind energy system, measuring at least one yield parameter of the wind energy system, and measuring at least one condition parameter. Further, the method includes the step of calculating at least one optimized value of the operational parameter based on the outcome of measuring at least one yield parameter, the outcome of the measuring of the at least one condition parameter, and historical data. Further, the method includes the step of resetting the at least one operational parameter to the at least one optimized value of the at least one operational parameter wherein the resetting is such that the yield parameter is optimized.

According to a first aspect of the present invention, the method for operating a wind energy system according to the invention includes the steps of:
  measuring a yield parameter of the wind energy system, thereby obtaining yield parameter measurement results;
  measuring a condition parameter, thereby obtaining condition parameter measurement results;
  calculating one or more optimized values of one or more operational parameters based on the yield parameter measurement results, the condition parameter measurement results, and historical data;
  transmitting the one or more optimized values of the one or more operational parameters to an actuator, the actuator being connected to an adjustable part of the wind energy system;
  repeated measuring of the yield parameter of the wind energy system, thereby obtaining repeated yield parameter measurement results; and
  storing the one or more optimized values of the one or more operational parameters and the repeated yield parameter measurement result in a database.

Thus, after a certain learning period the wind energy system is running in optimum mode. As a result, the average annual yield can be significantly higher.

Typically, the repeated yield parameter measurement results are compared to the yield parameter measurement results in order to determine whether the amendment of the operational parameter led to an increased yield parameter. If so, the controller detects that the optimization was successful. That is, the operation of the wind energy system may be continued with this operational parameter, or the operational parameter may be further improved in another optimization loop. If not, i.e. if the yield parameter decreased when the wind energy system was operated with the optimized value of the operational parameter, the self-learning controller detects that the optimization was not successful. In this case, the method of the present invention is repeated wherein the result of the unsuccessful optimization may be considered when calculating the optimized operational parameters. It is also typical that the method of the present invention may be repeated in specific time intervals. For instance, operational parameter changes can be made in distinct time intervals such as 10 minutes or more, e.g. a month. Typical time intervals for repeating the method are between 30 and 120 minutes. According to other embodiments, the method is repeatedly initiated when a decrease of a yield parameter is observed.

According to a further aspect of the invention, a wind energy system is provided having a sensor unit for measuring at least one yield parameter of the wind energy system, a sensor unit for measuring at least one condition parameter, one or more actuators for adjustment of at least one adjustable part of the wind energy system, and a self-learning controller. The self-learning controller is connected to the at least one sensor unit and the at least one actuator and receives measurement data from the at least one sensor unit. Further, the self-learning controller performs optimization calculations based on the measurement data and sends instruction signals to the at least one actuator based on the outcome of the optimization calculations for the adjustment of at least one adjustable part of the wind energy system. The instruction signals are such that the at least one yield parameter is optimized.

According to typical embodiments, the sensor unit for measuring the at least one yield parameter can be a current measurement device, a power measurement device, or a vibration measurement device. Further, the sensor unit for measuring the at least one condition parameter can be a wind measurement device, an azimuth position measurement device, a displacement transducer, a wind direction measurement device, a temperature measurement device, a pressure measurement device, and an air density measurement device. Further, according to typical embodiments, the actuator can be a pitch drive, nacelle drive, generator control, converter control, or main controller.

According to a further aspect of the invention, a wind park is provided having at least two wind energy systems according to the present invention and a connection between the wind energy systems. The connection includes a data connection for interchanging data, in particular, historical data. Generally, and not limited to wind parks, it is typical that a wind energy system receives historical data from other wind energy systems. Thus, the optimization calculations of each wind energy system can benefit from the experience gathered at other wind energy systems.

It is possible to use the method of the present invention in any wind energy system. Further, a self-learning controller according to the present invention can also be utilized in existing wind energy systems in order to improve the performance of the wind energy systems. In order to do so, the self-learning controller according to the present invention may be installed as a retrofit package in existing wind energy systems.

Further aspects, advantages and features of the present invention are apparent from the dependent claims, the description and the accompanying drawings.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
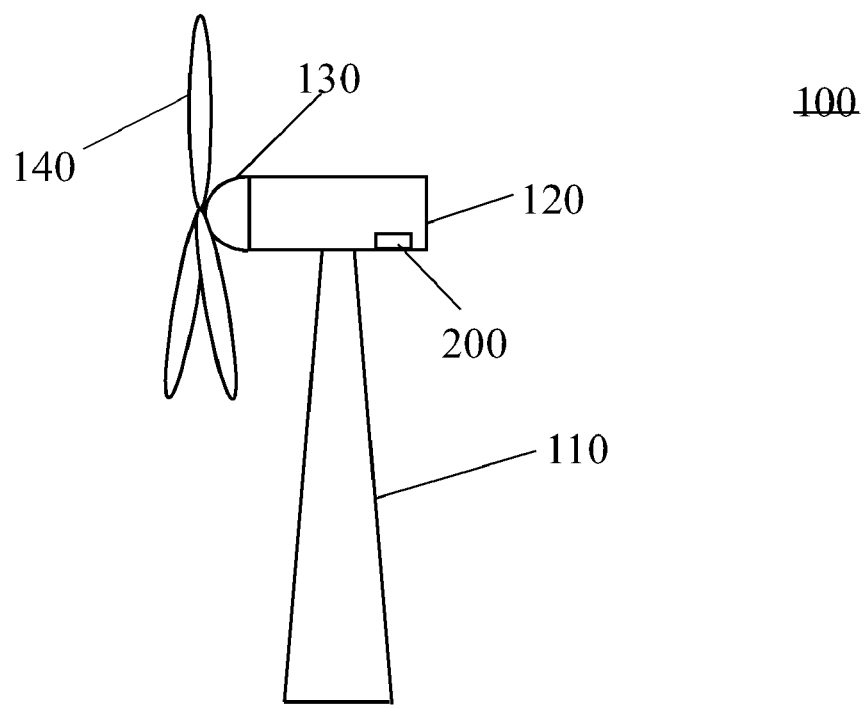
FIG. 1 is a schematic view of a wind turbine having a self-learning controller according to the present invention.

FIG. 1 is a schematic view of a wind turbine. The wind turbine 100 includes a tower 110 to which a machine nacelle 120 is mounted at its top end. The nacelle houses a drive train to which a main electric generator is connected (not shown). A hub 130 bearing three rotor blades 140 is mounted to a lateral end of the machine nacelle 120. The rotor blades 140 can be adjusted by pitch drives which are typically accommodated inside hub 130. The rotor blades 140 should be installed and aligned correctly. Typically, they are aligned such that at low wind speeds the blades are positioned in the aerodynamic 0 degree position. A self learning-controller 200 can be positioned within the nacelle. Alternatively, it can be positioned within the tower, for example integrated in a control cabinet along with other electrical devices.

Figure 2:
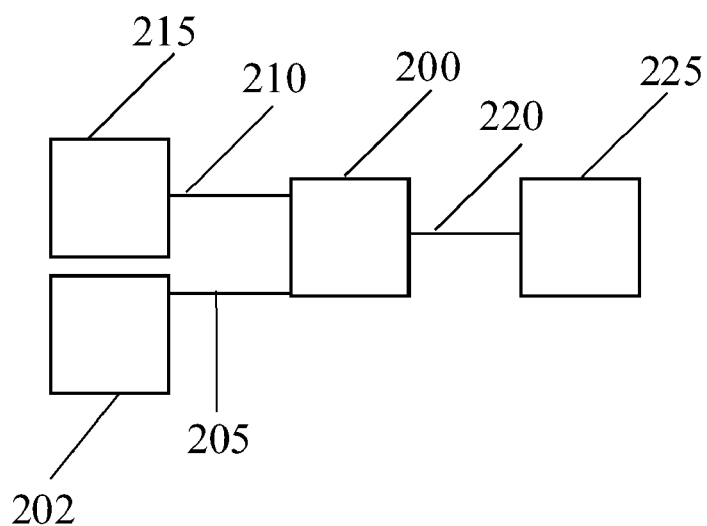
FIG. 2 is a block diagram of a first embodiment of the present invention.

FIG. 2 is a block diagram of one embodiment of the present invention. Therein, a self-learning controller 200 is connected via sensor connection 210 to a sensor 215. The sensor measures at least one yield parameter of the wind energy system such as the actual power output. Information on the outcome of these measurements is transmitted via sensor connection 210 to the self-learning controller. The self-learning controller is further connected to the actuator 225 via the actuator connection 220. The actuator 225 drives an adjustable part of the wind energy system. In one exemplary embodiment of the present invention, the actuator is the pitch drive that controls the rotor blade pitch angle. The self-learning controller 200 is further connected to a condition parameter sensor 202 via condition parameter sensor connection 205. A condition parameter sensor can be a wind measurement device, an azimuth position measurement device, a displacement transducer, a wind direction measurement device, a temperature measurement device, a pressure measurement device, or an air density measurement device.

Figure 3:
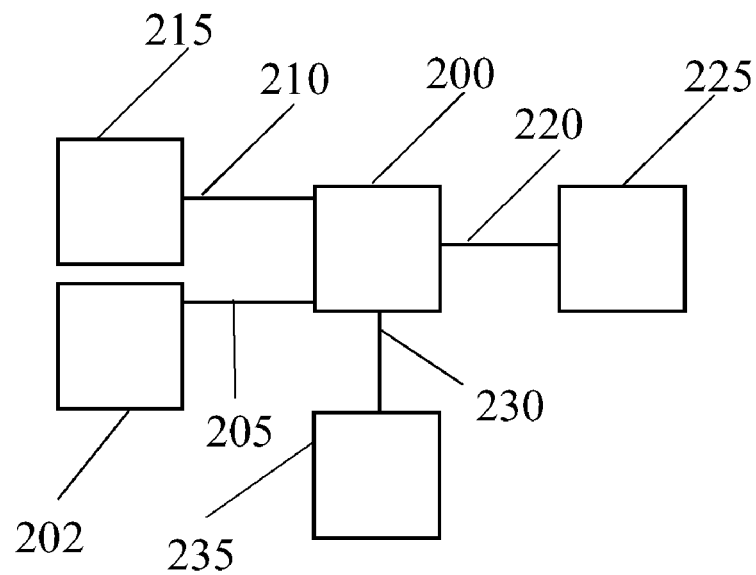
FIG. 3 is a block diagram of a second embodiment of the present invention.

FIG. 3 is a block diagram of another embodiment of the present invention. Further to the elements already described with respect to FIG. 2, a database 235 is connected via database connection 230 to the self-learning controller 200. The database may be used in various ways. Typically, the data of the optimization calculations are stored in the database. That is, the results of the optimization calculations as well as the respective input data, such as the respective values of the operational parameters, the condition parameters etc., may be stored in the database.

In one embodiment, site parameters are stored in the database. Site parameters shall be defined within this application as parameters of the wind energy system that do not change in time. Typically, site parameters may include information on the wind energy system tower height, the location of the wind energy system, the altitude of the location, and/or the average annual temperature. The location of the wind energy system is relevant for the optimization of the yield parameter such as the power curve or the power. For example, the site parameter location of the wind energy system can be set to different values depending on whether the wind energy system is situated in mountainous terrain, flat country, offshore, onshore, as a stand-alone wind energy system, or in the middle of a wind farm. Typically, site parameters are set along with the installation of the wind energy system.

Further information stored in the database can be historical data. Typically, historical data include a multitude of values of operational parameters and the respective yield parameters. The term "operational parameter" shall be understood within this application as a parameter that can be set and that indicates to an actuator of an adjustable part of the wind energy system what action the actuator has to perform. For instance, the nacelle drive is responsible for turning the nacelle such that the rotor blades extend perpendicular to the wind direction. When wind direction changes, the nacelle orientation has to be adjusted. In order to do so, the operational parameter of the nacelle position has to be changed. Being instructed by the adjusted operational parameter of the nacelle position, the nacelle drive moves the nacelle into the correct orientation. Apart from the nacelle position, typical operational parameters are the pitch angle of the rotor blades, the torque demand curve, the rotations per minute (rpm), the tip speed ratio, the loads on various elements of the wind energy system, azimuth position, or the vibration levels.

According to the present invention, historical data on yield parameters can also be stored on the database. The term "yield parameter" is to be understood as any parameter being correlated to the output of the wind energy system. Typically, the power curve is one of the yield parameters. The power curve indicates the power output of the wind energy system versus the wind speed. Further examples for typical yield parameters are energy, power, current, vibration level, loads on components, and component temperature. Examples for components of the wind energy system are the tower, the blades, the generator, the drives etc. Typical embodiments of the present invention allow optimizing one yield parameter of the wind energy system or several yield parameters of the wind energy system at the same time. As will become apparent by the examples given, some parameters of the wind energy system may be both yield parameters and operation parameters. For instance, the vibration level may be an operation parameter for optimizing the energy output of the wind energy system. In other embodiments, the vibration level may be the yield parameter which is to be optimized, as a reduction of the vibration level yields to a longer lifetime and, consequently, to a higher ratio of produced energy per installation and maintenance costs.

According to a further embodiment of the present invention, condition parameters can be stored in the database. The term "condition parameter" shall be understood in this application as any parameter being related to the environment of the wind energy system that changes in time. For instance, typical condition parameters are wind speed, wind direction, turbulence intensity, temperature, air pressure, or the number of days since the last rainfall. It shall be understood that all types of parameters described before can be stored in the database, however, it is not necessary to store all of them for performing the present invention.

Figure 4:
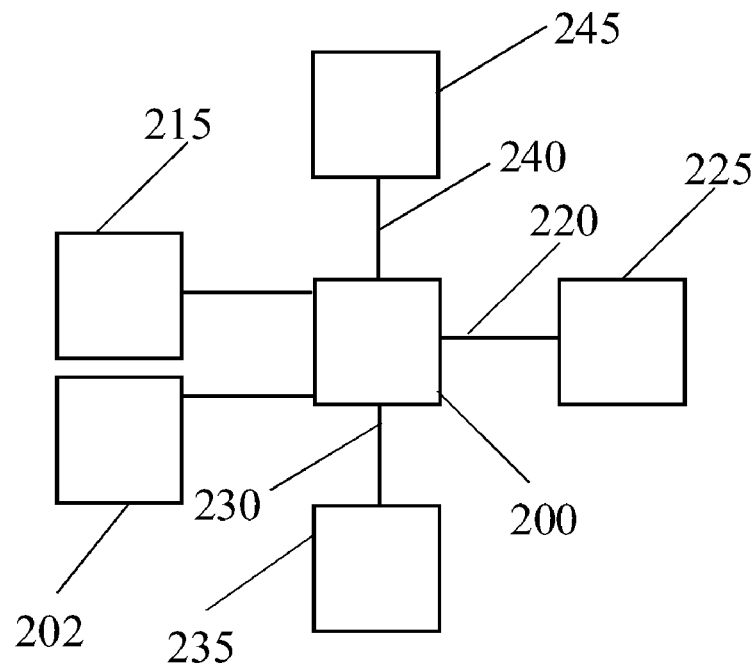
FIG. 4 is a block diagram of a third embodiment of the present invention.

FIG. 4 is a block diagram of another embodiment of the present invention. Further to the elements already shown in FIGS. 2 and 3, a clock 245 is connected to the self-learning controller 200 via the clock connection 240. In one embodiment, the clock provides the self-learning controller with the actual time. According to another embodiment, the clock supplies the self-learning controller with the time of day, the day, the day of the week, the month and/or the season. These time parameters might be useful in optimizing the wind energy system operation for different reasons. For example, the season can be an interesting time parameter as rain in autumn and winter cleans the blades and as such might improve the energy yield and power curve of the wind energy system. Another example is the time of day. The operation of the wind energy system could be limited by statutory noise regulations which allow for a smaller noise level at night than during day time. In this case it is important to meet the statutory noise requirements and at the same time optimize the energy yield of the wind energy system.

Figure 5:
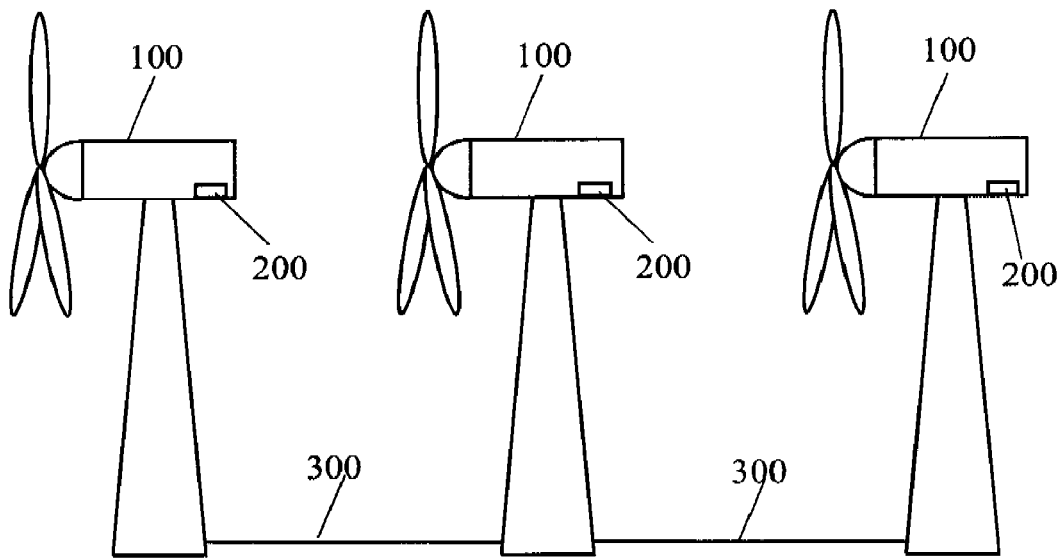
FIG. 5 is a schematic view of a fourth embodiment of the present invention with a plurality of wind energy systems.

FIG. 5 is a schematic view of a plurality of wind energy systems according to the present invention. The wind energy systems are connected to another by data connections 300. It is possible, though not necessary, that each wind energy system is linked to each other wind energy system. The data connection can be an arbitrary network that allows for the exchange of information between several wind energy systems. In particular, the data connections can be cable connections or wireless connections for transmitting data between the wind energy systems. The data connections are directly or indirectly linked to the controllers 200 of each wind energy system. When calculating optimized values of the operational parameters, the self-learning controller may also base its optimization calculation on the information provided by other wind energy systems and transmitted via the data connection 300. For the sake of simplicity, in the following, the "optimized values of the operational parameters" will be referred to as "optimized operational parameters". Typically, the wind energy systems of the same type are linked to each other in this way. By doing so, the optimization can be based on comprehensive experience data. Combining experience can be done, for example, on wind farm level, or by storing the data of all wind energy systems of the same type worldwide. In the latter case, it is not necessary that there is a direct or indirect connection between all wind energy systems. For example, it is possible that the data obtained in one wind energy system during a specific period of time, such as half a year or a year, is already stored in the database of another wind energy system when the latter is installed. Further, it is possible to select one wind energy system as being the central control station that gathers the data from all wind energy systems connected, and that provides the other wind energy systems with this data and/or data already analyzed and evaluated.

According to a typical embodiment of the present invention, the wind energy system comprises a database for providing the historical data. Based on the historical data, optimized operation parameters are calculated. According to another typical embodiment of the present invention, the wind energy system is linked to a data base that is not part of the wind energy system. For instance, the wind energy system could be connected to a central database that gathers the data from all wind energy systems that are connected to the central database. The central database may provide also other wind energy systems with the historical data and/or further data already analyzed and evaluated. In this case, it is possible that the wind energy system itself does not comprise a database. The central database may be connected to 10, 50, 100, or even more wind energy systems. The central database may comprise a processing unit (not shown) for evaluating all the data received by the wind energy systems. The central database needs not necessarily be at a wind energy system but could also be a stand-alone database, e.g. at the manufacturer's site.

Figure 6:
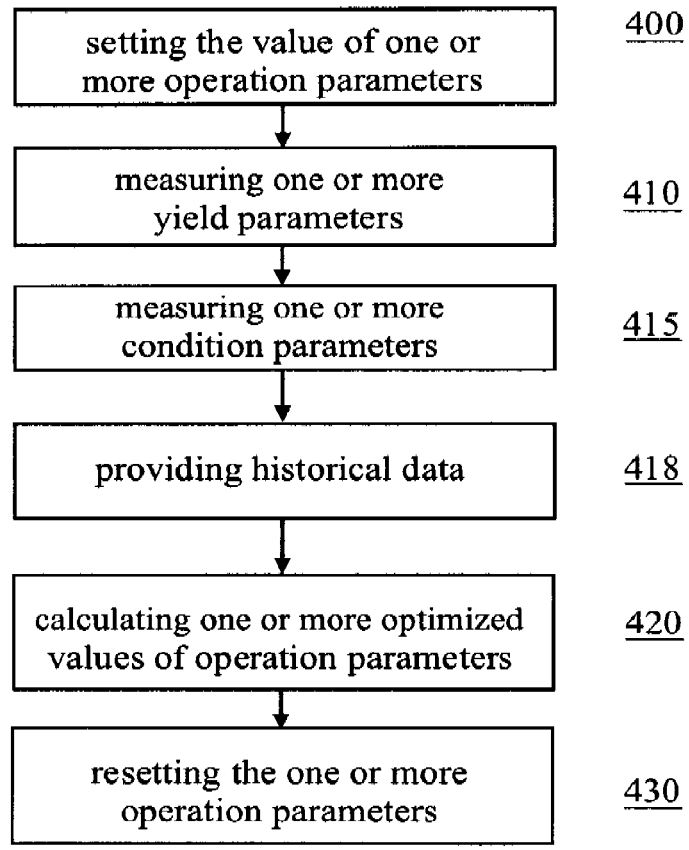
FIG. 6 is a flowchart diagram of a first embodiment of the method according to the present invention.

FIG. 6 is a flowchart diagram of an embodiment of the method according to the present invention. At step 400, at least one operational parameter of the wind energy system is set. The value at which that the operational parameter is set, may be taken from the database or have been calculated before as optimized operational parameter according to an embodiment of the method of the present invention. For instance, the operational parameter in question could be the number of rotations per minute.

In step 410 one or more yield parameters of the wind energy system are measured. For instance, the power output of the wind energy system could be measured. Both the value of the at least one operational parameter which was set in step 400 and the measured yield parameter of step 410 are provided to the self-learning controller. In step 415 one or more condition parameters of the wind energy system are measured. For instance, the actual wind speed, turbulence intensity, wind direction, air pressure, or temperature could be measured. The value of the at least one operational parameter which was set in step 400, the measured yield parameter of step 410, the measured condition parameters, and historical data 418 are provided to the self-learning controller. Based on these values, in particular on the historical data and the outcome of the measurements, one or more optimized operational parameters are calculated by the self-learning controller in step 420. In order to do so, it is typical that the self-learning controller bases its calculation on further information such as the actual value of further operational parameters, time parameters, site parameters or condition parameters. For example, apart from the measurement result of the yield parameter such as the energy output at the generator, the optimization calculation could be further based on the season, the weather condition, i.e. if it is rainy or sunny, the tower height, the actual wind speed, and the turbulence intensity as measured during the last two hours.

In step 430, the one or more operational parameters in question are reset to the optimized operational parameters as calculated in step 420. By setting the operational parameters to the optimized operational parameters, the energy yield of the wind energy system is improved. Hence, in the example given above, the energy output at the generator is increased. According to some embodiments of the present invention, the operation of the wind energy system is continued with said optimized operational parameter for a period of time such as 1 minutes, 10 minutes, 15 minutes, 30 minutes, 1 hour or more. According to other embodiments of the present invention, the optimized operational parameter is a starting point for further optimization loops. This will be explained exemplarily with respect to FIGS. 7 and 8.

According to typical embodiments of the present invention, the operation of the wind energy system is not instantaneously reacting on varying condition parameters. The self-learning controller may use a historical database to determine its optimum parameter settings. As such it is reacting indirectly on the condition parameters.

Figure 7:
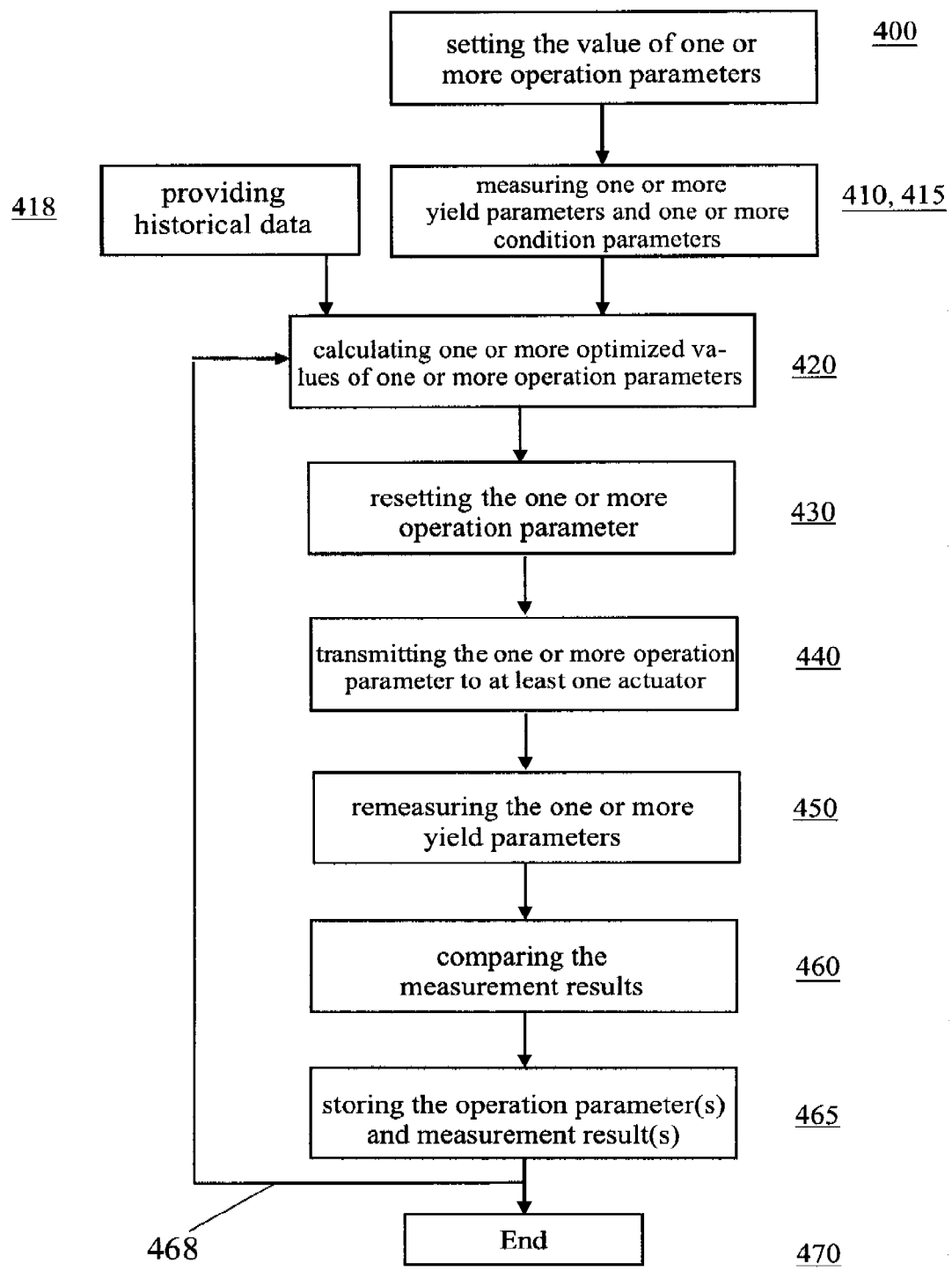
FIG. 7 is a flowchart diagram of a second embodiment of the method according to the present invention.

FIG. 7 is a flow chart of an embodiment of the method according to the present invention. As in the embodiment described with respect to FIG. 6, step 400 refers to the setting of at least one operational parameter, step 410 refers to the measurement of at least one yield parameter, step 415 refers to the measurement of at least one condition parameter, step 418 refers to the provision of historical data, step 420 refers to the calculation of at least one optimized operational parameter, and step 430 refers to the resetting of the at least one operational parameter to the one or more optimized operational parameter as calculated in calculating step 420. For the sake of simplicity, step 410 and step 415 are shown in one box. In all embodiments of the present invention, the condition parameters and the condition parameters may be measured at the same time or one after the other. It is possible to measure the yield parameter prior to measuring the condition parameter. It is also possible to measure the condition parameter prior to measuring the condition parameter. It is typical that the historical data is provided to the self-learning controller constantly, and the self-learning controller retrieves historical data whenever it is needed for the calculations. Further to these steps, in step 440, the one or more calculated optimized operational parameters are transmitted to one or more actuators with each actuator being connected with an adjustable part of the wind energy system. Examples for actuators and their respective adjustable parts are: Pitch drive and rotor blades; nacelle drive and nacelle; break activator and break; and magnetic field control and generator. The actuators, such as the pitch drives, adjust the respective adjustable parts of the wind energy system, such as the rotor blades, to the optimized operational parameter.

In step 450 one or more yield parameters are measured. Typically, the measured parameters in step 450 are identical to those measured in step 410. In step 460, the outcomes of the measurement of step 410 and the outcomes of the measurement of step 450 are compared by the self-learning controller. Additionally or alternatively, the measured values are also compared to historical data stored in the database and retrieved therefrom. In the situation that the yield parameter worsened when the wind energy system was operated with the one or more optimized operational parameters, the self-learning controller may use this information for a repeated calculation in a repeated step 420. In more detail, according to a typical embodiment, the loop 468 is obligatory when an increase in the yield parameter can not be detected in step 460. Typically, the yield parameter is optimized if it can be increased when operating the wind energy system with the optimized value of the operational parameter. Further, the yield parameter is also optimized if it cannot be increased any more, but remains at a high level given the actual circumstances.

Further, in step 465, the one or more operational parameters as set are stored in a database along with the outcome of the yield parameter measurements for later retrieval and comparison. Dependent on the outcome of the comparison result gathered in step 460, the optimization is stopped at this stage as it is indicated by reference number 470 in FIG. 7, or the optimization loop is continued. In this case, as indicated by line 468 in FIG. 7, the method is repeated from step 420. That is, one or more new optimized operational parameters are again calculated as described with respect to step 420. Those further steps already described are repeated as often as is necessary and/or meaningful. As the optimization of operational parameters can very much depend on actual condition parameters, it is possible that the optimization loop as described is never stopped during operation of the wind energy system. On the other hand, according to other embodiments, the number of loops in the method of the present invention, such as the method described with respect to FIG. 7, may be restricted to a given number, such as 5 repetition loops. Alternatively, the method may be stopped by proceeding to step 470 instead of starting the loop again when the comparison of step 460 yields to no or only a negligible improvement of the yield parameter. Further, carrying out the method of the present invention can be repeated in distinct time intervals such as 10 minutes, 30 minutes, 1 hour or 1 day.

Figure 8:
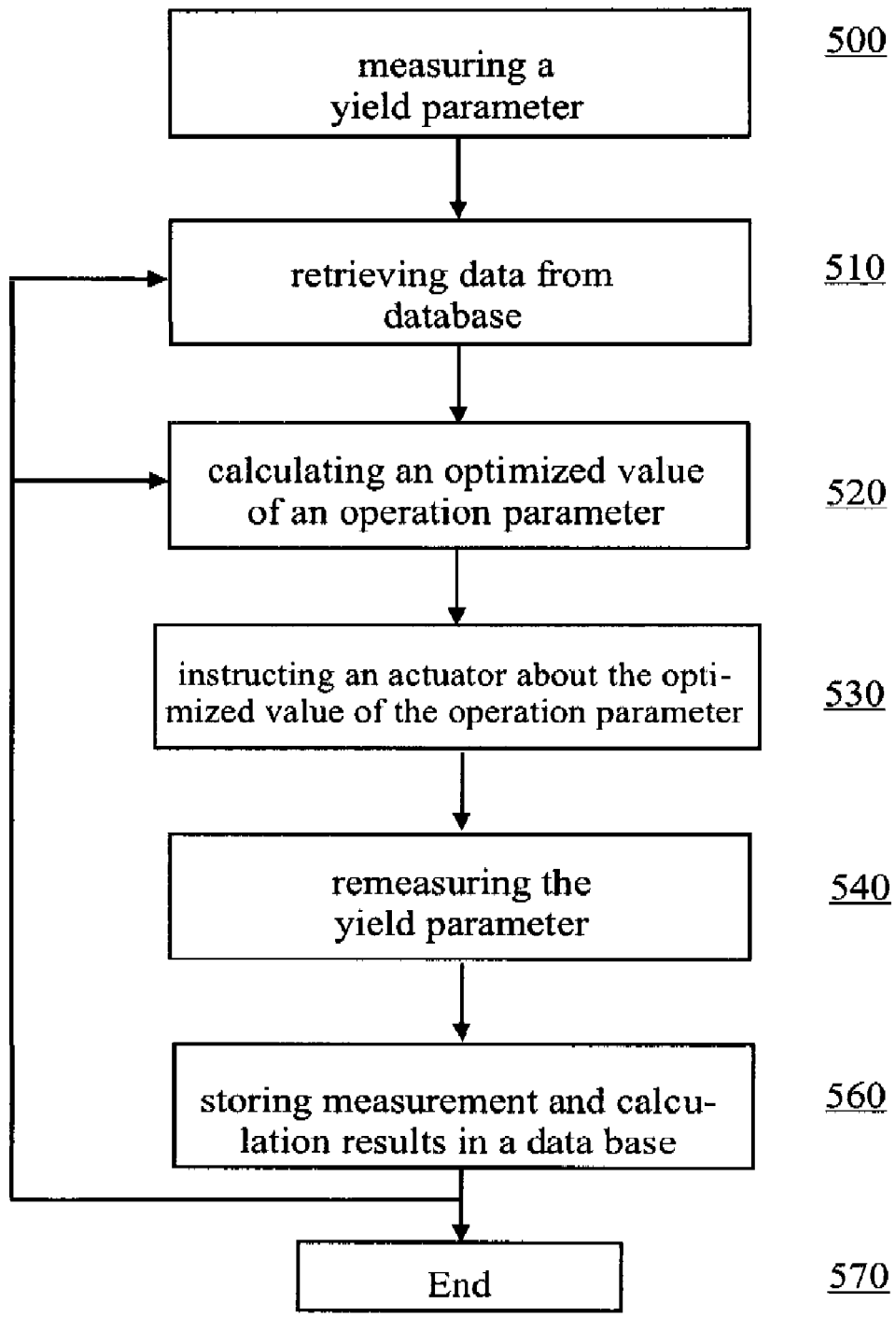
FIG. 8 is a flowchart diagram of a third embodiment of the method according to the present invention.

FIG. 8 shows another embodiment of the method according to the present invention. In step 500, one or more yield parameters are measured. In step 520, the self-learning control calculates one or more optimized operational parameters based on the measurement result received in step 500 and further on the data retrieved from the database in step 510. The relevant actuators are instructed to reset their respective operational parameters to the calculated optimized operational parameters in step 530. In step 540, the yield parameters which have already been measured in step 500 are measured again. At this stage, it is possible that the yield parameters measured in step 540 are compared to historical yield parameters from the database. In step 560, the measured yield parameters along with the optimized operational parameters as calculated in step 520 are stored in the database for later retrieval. At this stage, the method can be stopped as indicated by reference number 570. Alternatively, in typical embodiments, the method is continued with step 510 or step 520. If the method is continued with step 520, it is also possible that the information on the measured yield parameters is stored in some temporal memory such as an random access memory.

Figure 9:
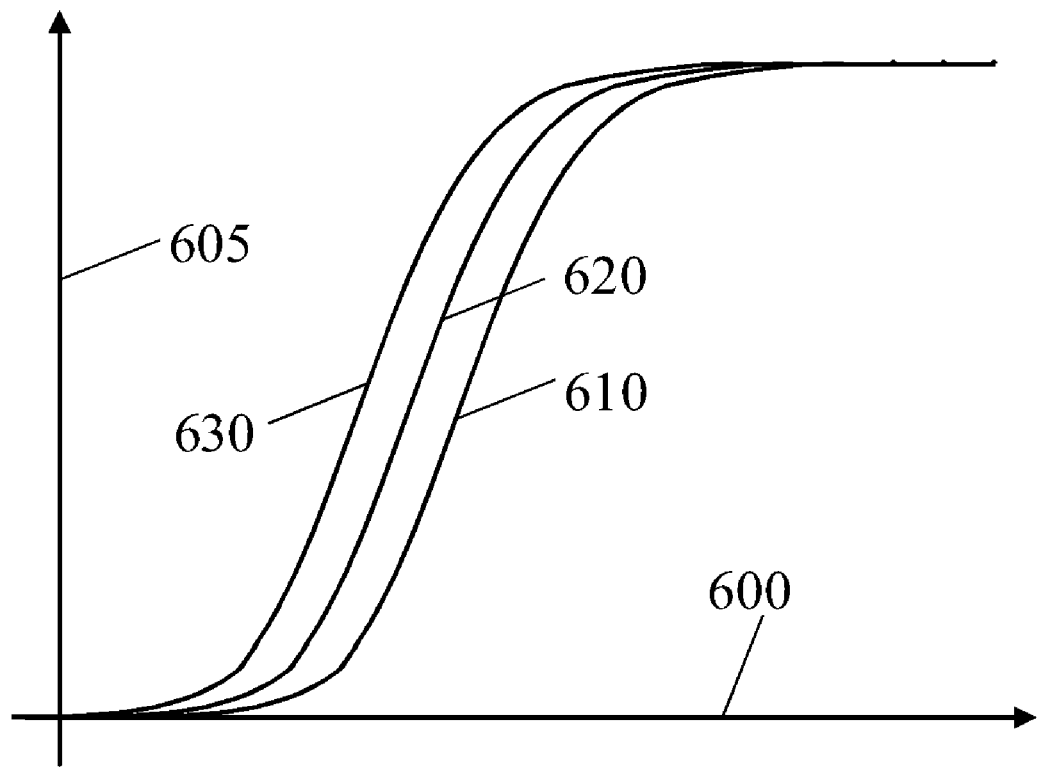
FIG. 9 is a diagram showing various power curves.

FIG. 9 is an exemplary diagram of three power curves 610, 620 and 630. The x-axis 600 represents the wind speed whereas the y-axis 605 represents the power output of the wind energy system. The power curve 610 shows the power curve of a wind energy system known in the art. After running an embodiment of the method of the present invention, it is possible to shift the power curve to better and higher yield values, as it is indicated by power curve 620. Power curve 630 refers to a further improvement of the yield parameter power curve. For instance, the improvement from power curve 610 to power curve 620 can be accomplished by performing an embodiment of the method of the present invention repeatedly for 10 days. The further improvement to power curve 630 could be based on performing an embodiment of the method of the present invention for a month. This is due to the fact that the more experience and historical data gathered, the better the optimization calculation.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind energy system, said method comprising:
   measuring a yield parameter of said wind energy system, thereby obtaining yield parameter measurement results;
   measuring a condition parameter, thereby obtaining condition parameter measurement results;
   calculating one or more optimized values of one or more operational parameters based on said yield parameter measurement results, said condition parameter measurement results, and historical data;
   resetting the one or more operational parameters to the calculated one or more optimized values;
   transmitting said one or more optimized values of said one or more operational parameters to an actuator, the actuator connected to an adjustable part of said wind energy system;
   repeated measuring of said yield parameter of said wind energy system, thereby obtaining repeated yield parameter measurement results; and
   storing said one or more optimized values of said one or more operational parameters and said repeated yield parameter measurement result in a database.

2. The method of claim 1, further comprising the step of: comparing said yield parameter measurement results with said repeated yield parameter measurement results.

3. The method according to claim 1, wherein said calculating one or more optimized values of said one or more operational parameters is further based on at least one site parameter.

4. The method according to claim 3, wherein said at least one site parameter comprises at least one of a location of said wind energy system, a tower height of said wind energy system, a terrain wherein said wind energy system is located, an altitude, and an average annual temperature.

5. The method according to claim 1, further comprising the step of:
   determining a time parameter;
   wherein said calculating one or more optimized values of said one or more operational parameters is further based on said time parameter.

6. The method according to claim 5, wherein said time parameter comprises at least one of a season, a month, a day, a time of day, and a day of the week.

7. The method according to claim 1, further comprising the step of:
   receiving data from other wind energy systems than said wind energy system;
   wherein said calculating one or more optimized values of said one or more operational parameters is further based on said data.

8. The method according to claim 1, wherein said method is repeated at least every minute.

9. A wind energy system comprising:
   a database configured to store historical data;
   at least one sensor configured to measure at least one yield parameter of the wind energy system;
   at least one actuator coupled to an adjustable part of the wind energy system;
   at least one wind measurement device configured to measure at least one condition;
   a controller coupled to the database, the at least one sensor, the at least one actuator, and the at least one wind measurement device, said controller configured to:
      receive the at least one measured yield parameter from said at least one sensor;
      receive the at least one condition from the at least one wind measurement device;
      retrieve the historical data from the database;
      determine one or more optimized values based on the at least one yield parameter, the at least one condition, and the historical data;
      reset one or more operational parameters to the determined one or more optimized values;
      transmit the one or more determined optimized values to said at least one actuator, wherein said at least one actuator adjusts at least one part of the wind energy system; and
      repeatedly measure the at least one yield parameter of the wind energy system, thereby obtaining repeated yield parameter measurement results.

10. A wind energy system according to claim 9, wherein the controller further configured to store the one or more determined optimized values in the database.

11. The wind energy system according to claim 9, wherein said controller further configured to receive data from other wind energy systems than said wind energy system, wherein said controller is configured to determine one or more optimized values further based on said received data.

12. The wind energy system according to claim 9, wherein the at least one condition parameter comprises at least one of a wind speed, a turbulence intensity, a wind direction, an air pressure, a temperature, and a number of days since last rain.

13. The wind energy system according to claim 9, wherein the at least one yield parameter comprises a power curve.

14. The wind energy system according to claim 9, wherein said at least one sensor comprises at least one of a current measurement device, a power measurement device, and a vibration measurement device.

15. A method for operating a wind energy system, said method comprising:
   measuring a yield parameter of the wind energy system, thereby obtaining yield parameter measurement results;
   measuring a condition parameter, thereby obtaining condition parameter measurement results;
   calculating one or more optimized values of one or more operational parameters based on the yield parameter measurement results, the condition parameter measurement results, and historical data;
   resetting the one or more operational parameters to the calculated one or more optimized values;
   transmitting the calculated one or more optimized values to an actuator, the actuator connected to an adjustable part of the wind energy system; and
   storing the calculated one or more optimized values and a repeated yield parameter measurement result in a database.

16. The method according to claim 15 further comprising repeatedly measuring the yield parameter of said wind energy system, thereby obtaining repeated yield parameter measurement results.

17. The method according to claim 16, wherein said method is repeated at least every minute.

18. The method according to claim 15 further comprising determining a time parameter, wherein said calculating one or more optimized values of the one or more operational parameters is further based on a time parameter.

19. The method according to claim 18, wherein the time parameter comprises at least one of a season, a month, a day, a time of day, and a day of the week.

20. The method according to claim 15, further comprising receiving data from other wind energy systems than the wind energy system, wherein said calculating one or more optimized values of the one or more operational parameters is further based on the received data.

* * * * *